(12) United States Patent
Oehler et al.

(10) Patent No.: US 12,313,137 B2
(45) Date of Patent: May 27, 2025

(54) DRIVE DEVICE FOR A BRAKING SYSTEM, AND BRAKING SYSTEM

(71) Applicant: Robert Bosch GmbH, Stuttgart (DE)

(72) Inventors: Claus Oehler, Karlsruhe (DE); Holger Seeg, Brackenheim (DE); Janos Tamas Csoti, Erligheim (DE); Mark Boehm, Lehrensteinsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 452 days.

(21) Appl. No.: 17/909,582

(22) PCT Filed: Mar. 3, 2021

(86) PCT No.: PCT/EP2021/055308
§ 371 (c)(1),
(2) Date: Sep. 6, 2022

(87) PCT Pub. No.: WO2021/180536
PCT Pub. Date: Sep. 16, 2021

(65) Prior Publication Data
US 2023/0116286 A1    Apr. 13, 2023

(30) Foreign Application Priority Data
Mar. 13, 2020   (DE) .................. 10 2020 203 276.9

(51) Int. Cl.
*F16D 65/18*  (2006.01)
*F16D 65/28*  (2006.01)
(Continued)

(52) U.S. Cl.
CPC .............. *F16D 65/28* (2013.01); *H02K 5/15* (2013.01); *H02K 5/225* (2013.01); *H02K 11/21* (2016.01);
(Continued)

(58) Field of Classification Search
CPC ...... F16D 65/18; F16D 65/28; F16D 2121/24; F16D 2125/50; B60T 13/741; H02K 11/21; H02K 5/15; H02K 5/225
See application file for complete search history.

(56) References Cited

U.S. PATENT DOCUMENTS 7,721,853 B2 * 5/2010 Chittka .................. F16D 65/18
                                                    188/162
11,286,979 B2 * 3/2022 Rossberger .............. B62M 6/50
(Continued)

FOREIGN PATENT DOCUMENTS

CN    101213726 A    7/2008
CN    201490801 U    5/2010
(Continued)

OTHER PUBLICATIONS

International Search Report for PCT/EP2021/055308, Issued Jul. 20, 2021.

*Primary Examiner* — Thomas W Irvin
(74) *Attorney, Agent, or Firm* — NORTON ROSE FULBRIGHT US LLP

(57) ABSTRACT

A drive device for a braking system of a motor vehicle. The drive device includes a housing and an electric machine that includes a rotatably supported drive shaft. The drive shaft is connected or connectable to an actuator element of the braking system via a planet wheel gear situated in the housing. The drive shaft is rotatably supported in a bearing shield situated in the housing. The bearing shield is made of plastic.

9 Claims, 1 Drawing Sheet

(51) Int. Cl.
*H02K 5/15* (2006.01)
*H02K 5/22* (2006.01)
*H02K 11/21* (2016.01)
*F16D 121/24* (2012.01)
*F16D 125/50* (2012.01)

(52) U.S. Cl.
CPC ...... *F16D 2121/24* (2013.01); *F16D 2125/50* (2013.01)

(56) References Cited

U.S. PATENT DOCUMENTS

| | | | |
|---|---|---|---|
| 12,145,551 B2* | 11/2024 | Chelaidite | B60T 1/065 |
| 2007/0068746 A1* | 3/2007 | Chittka | F16D 65/18 |
| | | | 188/72.6 |
| 2020/0063793 A1* | 2/2020 | Rossberger | B62M 6/50 |
| 2022/0307562 A1* | 9/2022 | Yoshizu | F16D 65/183 |
| 2023/0150467 A1* | 5/2023 | Chelaidite | B60T 1/065 |
| | | | 188/72.8 |
| 2023/0151860 A1* | 5/2023 | Knop | F16D 65/18 |
| | | | 74/89.39 |

FOREIGN PATENT DOCUMENTS

| | | |
|---|---|---|
| CN | 102545483 A | 7/2012 |
| CN | 109863328 A | 6/2019 |
| DE | 102008053567 A1 | 4/2010 |
| DE | 102016221162 A1 | 5/2018 |
| DE | 102017131120 A1 | 6/2019 |
| JP | 2013154841 A | 8/2013 |
| WO | 2017203753 A1 | 11/2017 |

* cited by examiner

DRIVE DEVICE FOR A BRAKING SYSTEM, AND BRAKING SYSTEM

FIELD

The present invention relates to a drive device for a braking system of a motor vehicle, comprising a housing and an electric machine that includes a drive shaft, the drive shaft being connected or connectable to an actuator element of the parking brake via a planet wheel gear situated in the housing, and the drive shaft being rotatably supported in a bearing shield situated in the housing.

Moreover, the present invention relates to a braking system for a motor vehicle, comprising a housing in which an electric machine is situated, and an actuator element that is drivable by the electric machine, a planet wheel gear being connected between the actuator element and the electric machine.

BACKGROUND INFORMATION

Drive devices of the general type mentioned above are described in the related art. With the increasing electrification of motor vehicles, braking systems are also being electrified. In particular, the parking brake is already electromotively driven in series vehicles. For this purpose, a drive device is present that includes an electric machine, in particular an electric motor, with the aid of which, for example, a drive spindle of the parking brake is driven for displacement of a brake piston. To achieve a high torque or a high contact force via the brake piston, a planet wheel gear that acts as a transmission gear is connected between the electric motor and the brake piston. The drive shaft of the electric machine is in particular rotatably fixedly connected to the sun wheel of the planet wheel gear, and the drive spindle is rotatably fixedly connected to the planet carrier of the planet wheel gear. For supporting the shaft, the shaft is rotatably supported, for example, by a rolling element bearing in a bearing shield situated in the housing.

SUMMARY

A drive device according to the present invention may have the advantage that, due to an advantageous configuration of the bearing shield, a highly integrated design of the drive device is provided that robustly ensures all functions with a small installation space, the number of parts of the drive device being reduced, and thus installation time and manufacturing time being decreased, with corresponding cost advantages. According to the present invention, this is achieved in that the bearing shield is made of plastic. This has the advantage that on the one hand the bearing shield itself has an inexpensive, weight-saving design, and on the other hand the bearing shield may be supplemented with further functions or further elements of the drive device with little additional effort.

According to one advantageous specific embodiment of the present invention, the bearing shield forms an annulus gear of the planet wheel gear. The annulus gear of the planet wheel gear is thus integrated directly into the bearing shield, which also supports the drive shaft of the electric machine. Due to forming the bearing shield from plastic, the annulus gear is cost-effectively integratable into the bearing shield during manufacture, using simple means. The annulus gear is thus manufactured from plastic, in one piece with the bearing shield.

According to one preferred refinement of the present invention, the bearing shield includes at least one steel ring that is coated, at least in sections, by the plastic material of the bearing shield. The steel ring strengthens and reinforces the bearing shield, resulting in a type of two-component part which on the one hand is characterized by the low weight of the plastic, and on the other hand provides robustness, at least in sections, that is customary with a steel bearing shield.

According to an example embodiment of the present invention, the steel ring particularly preferably has an enlarged edge section that extends over the entire circumference and is coated by the plastic material of the bearing shield. As a result of the enlarged edge section being coated, the plastic portion of the bearing shield and the steel ring are connected to one another in a form-fit manner. The plastic material engages behind the edge section of the steel ring, thus achieving a particularly robust connection.

According to an example embodiment of the present invention, the steel ring preferably includes a press-in section that extends over the entire circumference and is free of plastic material, and that has a cylindrical sleeve-shaped lateral surface for support on the housing. As a result of the press-in section being free of plastic material, the steel ring, as a carrier of the bearing shield, is advantageously pressable into a corresponding receptacle of the housing, in particular without the plastic material of the bearing shield being damaged as a result. A type of separation of the functions thus takes place, in which the retention force for aligning and holding the bearing shield in the housing is provided by the steel ring, and the annulus gear is provided solely by the plastic material. According to one alternative specific embodiment of the present invention, the press-in section is formed by the bearing shield itself, and is thus made of plastic. In this regard, according to this specific embodiment the steel ring is dispensed with. According to a further specific embodiment of the present invention, the steel ring is preferably enclosed, in particular coated, along its entire circumference by the plastic of the bearing shield.

In particular, the outer diameter of the press-in section is slightly larger than the inner diameter of a receiving section of the housing for the bearing shield in order to achieve a press fit between the bearing shield or steel ring of the bearing shield and the housing. Simple installation of the bearing shield in the housing is also ensured in this way.

Furthermore, it is preferably provided that the bearing shield includes at least one receiving recess and/or at least one receiving protrusion for arranging a sensor, in particular a rotor position sensor, at the bearing shield. An advantageous form-fit arrangement of the rotor position sensor at the bearing shield is made possible by the receiving recess and/or the receiving protrusion, thus ensuring simple installation and a robust arrangement of the rotor position sensor at the bearing shield.

According to an example embodiment of the present invention, the receiving recesses and/or the receiving protrusion are/is particularly preferably designed for accommodating an annular ring-shaped circuit board of the sensor. The sensor or its circuit board is thus situatable and holdable, in particular in a form-fit manner, in the receiving recess and/or at the receiving protrusion. Additional fastening means or arrangement means may thus be dispensed with.

According to an example embodiment of the present invention, the bearing shield particularly preferably forms a plug connection for a connection contact of the drive device, for example for electrically contacting the sensor. An electrical connection to the electric machine may thus be automatically established during the installation of the bearing shield in the drive device. In particular, the plug connection includes a sleeve that axially protrudes from the bearing shield and is formed in one piece with the bearing shield, and preferably includes an insertion bevel into which a connection contact of the electric machine may be introduced. One or more electrical lines, which have already been coated by the plastic material of the bearing shield during manufacture of the bearing shield, advantageously lead into the sleeve.

According to one preferred refinement of the present invention, a circuit board that carries or includes the above-mentioned rotor position sensor is situated at the section of the bearing shield. This results in an advantageously compact arrangement. In particular, the circuit board represents an integral part of the rotor position sensor, one or more coils, in particular a receiver coil and a transmitter coil that are interconnected in the manner of a resolver in order to determine a rotor angle position of the rotor of the electric machine, preferably being situated at the circuit board.

A braking system according to the present invention includes the drive device according to the present invention. This results in the advantages stated above.

The present invention is explained in greater detail below with reference to the figures.

DETAILED DESCRIPTION OF EXAMPLE EMBODIMENTS

Figure 1:
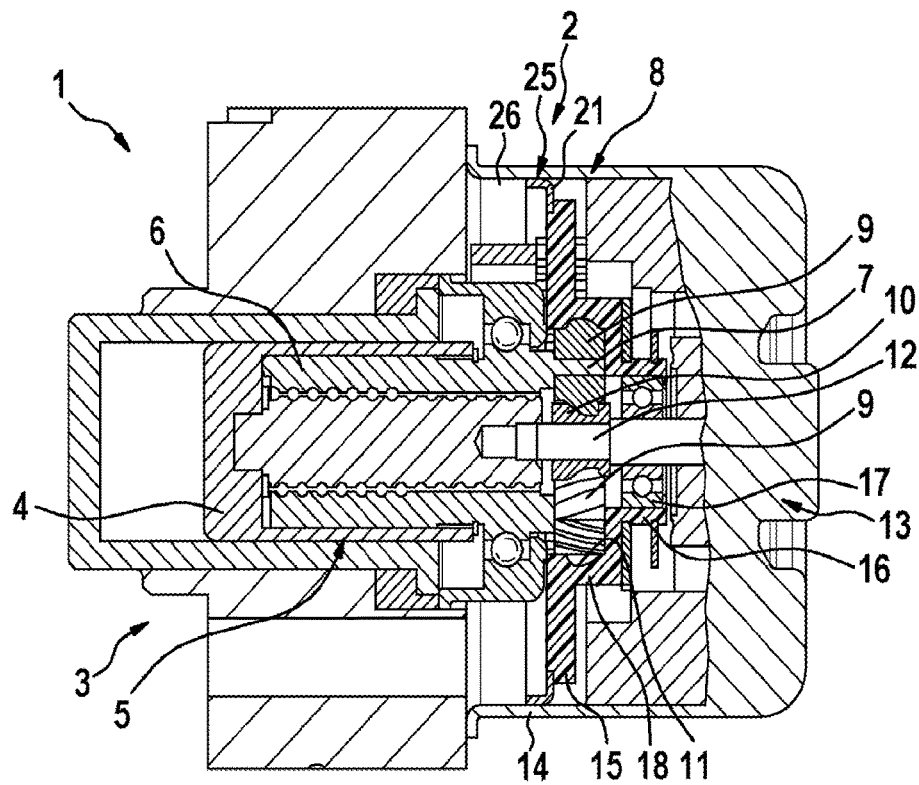
FIG. 1 shows an advantageous parking brake in a simplified longitudinal sectional illustration.

FIG. 1 shows a simplified longitudinal sectional illustration of an advantageous braking system 1 for a motor vehicle, not illustrated in greater detail here. Braking system 1 includes a drive device 2 that is operatively connected to an actuator 3 of the parking brake. Actuator 3 includes in particular an actuator element 4, in the present case in the form of a brake piston or hydraulic piston, that is axially displaceable by a spindle drive 5. A drive spindle 6 of spindle drive 5, which is designed as a hollow spindle, is connected to a planet carrier 7 of a planet wheel gear 8. Planet wheels 9, which are rotatably supported on planet carrier 7, cooperate with a sun wheel 10 and with an annulus gear 11 of planet wheel gear 8. Sun wheel 10 is rotatably fixedly connected to a drive shaft 12 of an electric machine 13 of drive device 2.

Drive device 2 also includes a housing 14 in which electric machine 13 and planet wheel gear 8 are situated. Also situated in housing 14 is a bearing shield 15 having a first bearing section 16 in which in the present case a rolling element bearing 17, which is operatively connected to drive shaft 12, is situated. In particular, an inner ring of the rolling element bearing is rotatably fixedly connected to drive shaft 12, while an outer ring of rolling element bearing 17 is rotatably fixedly held at section 16 of bearing shield 15.

In a second section 18 that follows the first section and whose inner diameter is larger than the inner diameter of first section 16, bearing shield 15 forms annulus gear 11 of planet wheel gear 8. Annulus gear 11 is thus integrally formed in bearing shield 15.

Figure 2:
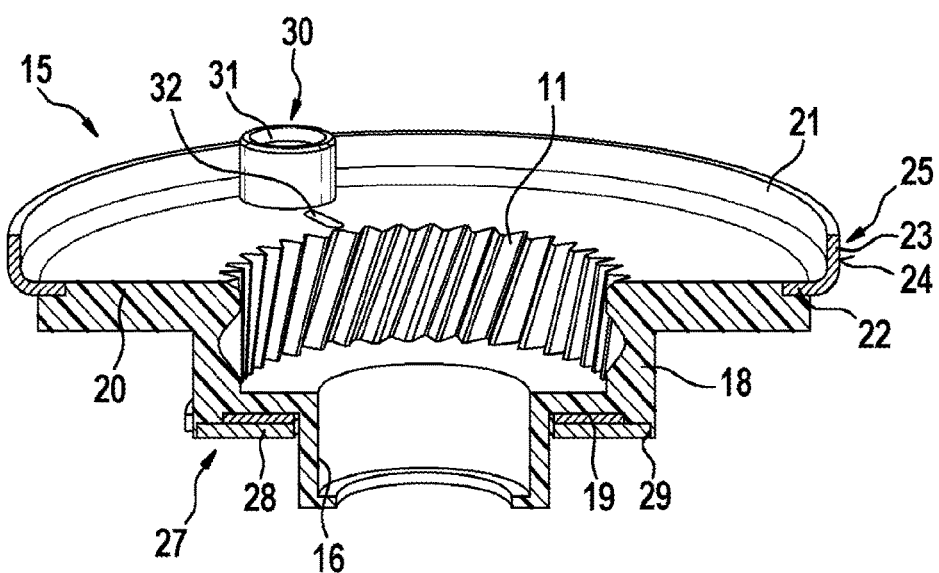
FIG. 2 shows a bearing shield of the parking brake in a simplified sectional illustration.

FIG. 2 shows a perspective sectional illustration of bearing shield 15. Bearing shield 15 is essentially made of plastic, as the result of which in particular the one-piece design of annulus gear 11 with bearing shield 15 is cost-effectively achievable during manufacture of the bearing shield. Between section 18 and section 16 of bearing shield 15, due to the change in diameter, bearing shield 15 forms a step that is designed as an annular disk section 19. An annular disk section 20 of the bearing shield that extends radially outwardly from annulus gear 11 is likewise formed on the side of section 18 facing away from section 16.

At the outer circumference of annular disk section 20, a steel ring 21 is associated with the annular disk section. This steel ring has an L-shaped cross section, one leg 22 protruding into annular disk section 20 and being coated or enclosed by the plastic material of bearing shield 15. The other leg 23 of L-shaped steel ring 21 extends axially from annular disk section 20, in particular in the direction of the side of bearing shield 15 facing away from sections 18 and 16. While leg 22 is enclosed by the plastic material, leg 23 of steel ring 21 is free of plastic, and at its shell outer side 24 forms a press-in section 25 of bearing shield 15. The outer diameter of press-in section 25 is slightly larger than the inner diameter of a receiving section 26 of housing 14 of drive device 2, so that the bearing shield together with steel ring 21 is pressable into housing 14, and as shown in FIG. 1, is preferably pressed in.

As further shown in FIG. 2, a rotor position sensor 27 is preferably also associated with section 19, and includes an annular ring-shaped circuit board 28 that is inserted into a receiving recess 29, formed coaxially with respect to annular ring-shaped bearing shield 15, of section 19 on the side facing away from annulus gear 11, and thus held at bearing shield 15 in a form-fit manner. In particular, circuit board 28 carries a transmitter coil and a receiver coil that are operated by a processing unit in order to determine or monitor via induction a rotor angle position of a rotor of electric machine 13.

Bearing shield 15 optionally also includes a connection device 30 via which rotor position sensor 27 is electrically contactable. For this purpose, connection device 30 is designed as a plug connection 31 that protrudes from section 20, an electrical line 32 being led from plug connection 31, through the plastic material of the bearing shield, to section 19 for electrically contacting sensor 27. Electrical line 32 is in particular already enclosed or coated by the plastic material during manufacture of the bearing shield. Plug connection 31 includes in particular a sleeve that axially protrudes from annular disk section 20 and is formed in one piece with bearing shield 15, and into which the mating contact or connection contact of the electric machine is insertable, in particular during the installation of bearing shield 15 in housing 14, in order to electrically contact sensor 27.

According to a further exemplary embodiment not illustrated here, steel ring 21 is completely enclosed by the plastic material of bearing shield 15. It is also possible to design bearing shield 15 without steel ring 21, so that press-in section 25 is made solely of the plastic material of bearing shield 15. It is also possible to situate annulus gear 11 as a separate element in bearing shield 15, so that the annulus gear may also be made of some other material that that of bearing shield 15.

What is claimed is:

1. A drive device for a braking system of a motor vehicle, comprising:
  a housing; and
  an electric machine that includes a rotatably supported drive shaft, the drive shaft being connected or connectable to an actuator element of the braking system via a planet wheel gear situated in the housing, the drive shaft being rotatably supported in a bearing shield situated in the housing, wherein the bearing shield is made of plastic, and includes: (i) at least one receiving recess for arranging a sensor at the bearing shield and/or (ii) at least one receiving protrusion for arranging the sensor at the bearing shield, the receiving recess and/or the receiving protrusion having an annular ring-shaped configuration for accommodating an annular ring-shaped circuit board of the sensor.

2. The drive device as recited in claim 1, wherein the bearing shield forms an annulus gear of the planet wheel gear.

3. The drive device as recited in claim 1, wherein the bearing shield includes at least one steel ring that is coated, at least in sections, by plastic material of the bearing shield.

4. The drive device as recited in claim 3, wherein the steel ring has an enlarged edge section that extends over an entire circumference and is coated by the plastic material of the bearing shield.

5. The drive device as recited in claim 3, wherein the steel ring includes a press-in section that extends over an entire circumference and is free of plastic material, and that has a cylindrical sleeve-shaped lateral surface for support on the housing.

6. The drive device as recited in claim 5, wherein an outer diameter of the press-in section is slightly larger than an inner diameter of a receiving section of the housing for the end plate in order to achieve a press fit.

7. The drive device as recited in claim 1, wherein the bearing shield includes a plug connection configured to electrically contact the electric machine, the plug connection being formed in one piece with the bearing shield and protrudes axially from the bearing shield.

8. The drive device as recited in claim 1, wherein the bearing shield includes the receiving recesses, and an annular ring-shaped circuit board including a rotor position sensor is situated in the receiving recess.

9. A braking system for a motor vehicle, comprising:
a drive device that includes a housing in which an electric machine is situated, and an actuator element that is drivable by the electric machine, a planet wheel gear being connected between the actuator element and the electric machine, the drive shaft being rotatably supported in a bearing shield situated in the housing,
wherein the bearing shield is made of plastic, and includes: (i) at least one receiving recess for arranging a sensor at the bearing shield and/or (ii) at least one receiving protrusion for arranging the sensor at the bearing shield, the receiving recess and/or the receiving protrusion having an annular ring-shaped configuration for accommodating an annular ring-shaped circuit board of the sensor.

\* \* \* \* \*